(12) United States Patent
Karaoguz

(10) Patent No.: US 8,923,883 B2
(45) Date of Patent: *Dec. 30, 2014

(54) ANTICIPATORY LOCATION-BASED MOBILE COMMUNICATION MEDIA TRANSFER

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 12/366,352

(22) Filed: Feb. 5, 2009

(65) Prior Publication Data
US 2009/0203388 A1 Aug. 13, 2009

Related U.S. Application Data

(60) Provisional application No. 61/026,792, filed on Feb. 7, 2008.

(51) Int. Cl.
| | |
|---|---|
| H04W 24/00 | (2009.01) |
| H04W 4/02 | (2009.01) |
| H04W 4/18 | (2009.01) |
| H04L 29/08 | (2006.01) |
| H04W 28/26 | (2009.01) |

(52) U.S. Cl.
CPC *H04W 4/02* (2013.01); *H04W 4/18* (2013.01); *H04L 67/18* (2013.01); *H04W 4/028* (2013.01); *H04W 28/26* (2013.01)
USPC .................................................. 455/456.1

(58) Field of Classification Search
USPC ......................................... 455/456.1, 456.3
See application file for complete search history.

(56) References Cited

U.S. PATENT DOCUMENTS 6,487,393 B1* 11/2002 Davenport et al. .......... 455/67.7
7,072,670 B2* 7/2006 Sato et al. ................. 455/456.1

(Continued)

FOREIGN PATENT DOCUMENTS

| EP | 1 085 696 | 3/2001 |
|---|---|---|
| EP | 1 209 930 | 5/2002 |

(Continued)

OTHER PUBLICATIONS

European Search Report for European Patent Application No. 09001694.0-2414, dated Jan. 18, 2010.

*Primary Examiner* — Kent Chang
*Assistant Examiner* — Scott Au
(74) *Attorney, Agent, or Firm* — Brinks Gilson & Lione (57) ABSTRACT

Methods and systems for anticipatory location-based mobile communication media transfer are disclosed and may include pre-planning communication of information with a mobile communication device (MCD) based on present and future locations of the MCD and the availability of wireless services. The MCD may include location-determining capability which may include one or more of: a global navigation satellite system, triangulation, and ultra-wideband positioning. A travel route of the MCD may be anticipated utilizing the locations. The travel route may traverse one or more wireless coverage areas and the communication of information with the MCD may be configured when the travel route enters a wireless coverage area with a desired wireless capability, which may include one or more of: bandwidth, data transfer rate, cost, power requirements, channel conditions, quality of service, and secure communications capability. The information may include multimedia data. The MCD may include a plurality of wireless protocol capabilities.

25 Claims, 6 Drawing Sheets

(56) References Cited

U.S. PATENT DOCUMENTS 7,085,576 B2 * 8/2006 Ranganathan ............. 455/456.1
2002/0094815 A1 * 7/2002 Kanerva ....................... 455/445
2009/0254659 A1 * 10/2009 Li et al. ........................ 709/225

FOREIGN PATENT DOCUMENTS

| EP | 1 544 574 | 6/2005 |
| EP | 1 737 160 | 12/2006 |
| WO | 96/13951 | 5/1996 |

* cited by examiner

ANTICIPATORY LOCATION-BASED MOBILE COMMUNICATION MEDIA TRANSFER

CROSS-REFERENCE TO RELATED APPLICATIONS/INCORPORATION BY REFERENCE

This application makes reference to and claims priority to, and claims the benefit of U.S. Provisional Patent Application Ser. No. 61/026,792 filed on Feb. 7, 2008.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to anticipatory location-based mobile communication media transfer.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet has become pervasive in mobile communications. The mobile Internet is a common source of everyday information, and easy, versatile mobile access to this data will be taken for granted.

There is an increasing amount of information being transferred (e.g., to and/or from mobile communication devices). Such increasing amounts of information being transferred consume large amounts of bandwidth of current information communication systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for anticipatory location-based mobile communication media transfer, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for anticipatory location-based mobile communication media transfer. Exemplary aspects of the invention may comprise pre-planning communication of information with a mobile communication device (MCD) based on present and future locations of the MCD and the availability of wireless services in the present and future locations. The MCD may comprise location-determining capability which may comprise one or more of: a global navigation satellite system, triangulation, and ultra-wideband positioning. A travel route of the MCD may be anticipated utilizing the present and future locations. The travel route may traverse one or more wireless coverage areas and the communication of information with the MCD may be configured when the travel route enters a wireless coverage area with a wireless capability at a desired level. The desired level may comprises one or more of: bandwidth, data transfer rate, cost, power requirements, channel conditions, quality of service, and secure communications capability. The information may comprise multimedia data and the MCD may comprise a plurality of wireless protocol capabilities.

Figure 1:
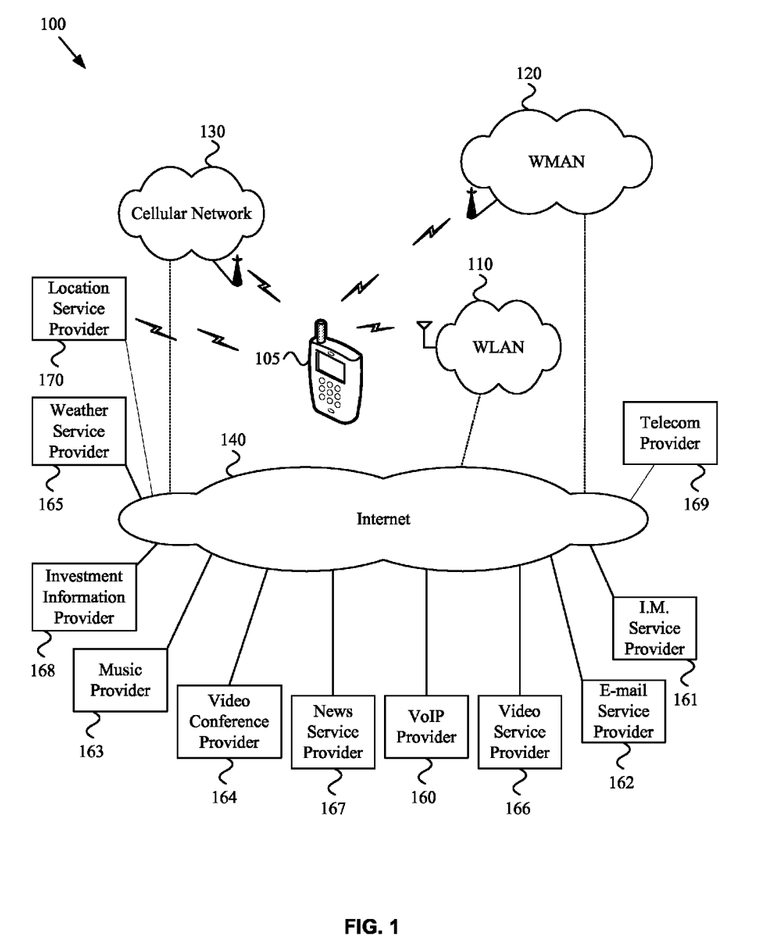
FIG. 1 is a block diagram of exemplary communication services that might be provided by a mobile communication device, in accordance with various aspects of the present invention.

FIG. 1 is a block diagram of exemplary communication services that might be provided by a mobile communication device, in accordance with various aspects of the present invention. Referring to FIG. 1, there is shown an exemplary wireless communication environment 100 comprising a mobile communication device (MCD) 105, a wireless local area network (WLAN) 110, a wireless metropolitan area network (WMAN) 120, a cellular network 130, and the Internet 140. The wireless communication environment 100 may also comprise various service providers that communicate via the Internet 140 such as a telecom provider 169, an instant messaging (IM) provider 161, an email service provider 162, a video service provider 166, a voice over Internet protocol (VoIP) provider 160, a news service provider 167, a video conference provider 164, a music provider 163, an investment information provider 168, a weather service provider 165, and a location service provider. One or more of the service providers may communicate with the MCD 105 via means other than the Internet 140 such as by global location techniques, GPS, for example.

The MCD 105 may comprise suitable circuitry, logic, and/ or code that may enable the communication of wireless signals over a plurality of communication protocols, such as cellular, WLAN, WMAN, Zigbee, GPS, and WiMax, for example. The MCD 105 may, for example and without limitation, comprise a cellular telephone, portable email device, handheld computer, laptop computer, mobile gaming platform, mobile media playing device, mobile positioning system, etc.

Information and media communicated by the MCD 105 may take many forms. Communicated information may comprise media information (e.g., audio, video, graphical, etc.), document information, general data information, person-to-person or group communication information, voice data, videoconference information, advertisement information, map information, travel information, investment information, pictorial information, news information, stock ticker information, for example.

The popularity of mobile communication devices is increasing. Thus, not only is the amount of data per MCD increasing, but the number of MCDs is increasing as well. The available communication bandwidth is limited, in particular over the RF interface. As more wireless communication occurs, the wireless communication environment is becoming more hostile. For example, the amount of interference from the increased number and types of MCDs and increased data traffic per MCD is increasing. All of these factors lead to increasing difficulty and/or complexity in transferring information and/or media to and/or from mobile communication devices and communication network access points.

Network access points may, for example and without limitation, comprise cellular base stations, wireless LAN access points, wireless MAN access points, wireless PAN access points, etc. In many scenarios, the MCD 105 (or user thereof) may have access to a plurality of communication networks through which information may be transferred. The MCD 105 may have the ability to transfer the same type (or substantially the same type) of information through any one or more of a plurality of communication networks. Various communication networks may have different respective information transfer capabilities, such as different data rates, channel conditions, associated monetary costs, Quality-of-Service, secure communication capabilities, and associated power utilization, for example.

Access to various communication networks may be location dependent. For example, the MCD 105 may have nationwide cellular telecommunication network coverage, office-wide or home-wide WLAN coverage, city-wide WMAN coverage, and/or home-office-wide personal area network (PAN) coverage. In another example, a user may not have long term evolution (LTE) coverage at home, but will at some point on the way to work. In another example, a user may not have WiMAX coverage at work, but will at the airport. During travel, the MCD 105 may pass through various coverage areas associated with various respective communication networks, as described with respect to FIG. 2.

In operation, for many scenarios, information and/or media transfer may not be time critical. For example, a user may desire to download particular information to the MCD 105 by a particular time goal, but not necessarily immediately. In an exemplary scenario, a user may be traveling and desire to have access at the MCD 105 to particular information by the time the user arrives at a particular destination. In another exemplary scenario, a user may desire to have particular media information downloaded to the MCD by the time the user returns home or by a particular time in the evening. In yet another exemplary scenario, a user of an MCD may desire to send an information file to a recipient at some point in the next N hours.

Mobile communication devices may be combined with location determination capability. For example, the MCD 105 may have on-board location determination capability such as global navigation satellite systems such as GPS, Galileo, and GLONASS, as well as triangulation, UWB positioning capability, determining location based on locations of known signals and/or networks, for example. Similarly, the MCD 105 may receive information of its location from other devices such as communication network infrastructure devices and/or personal electronic devices with position determining capability.

Figure 2:
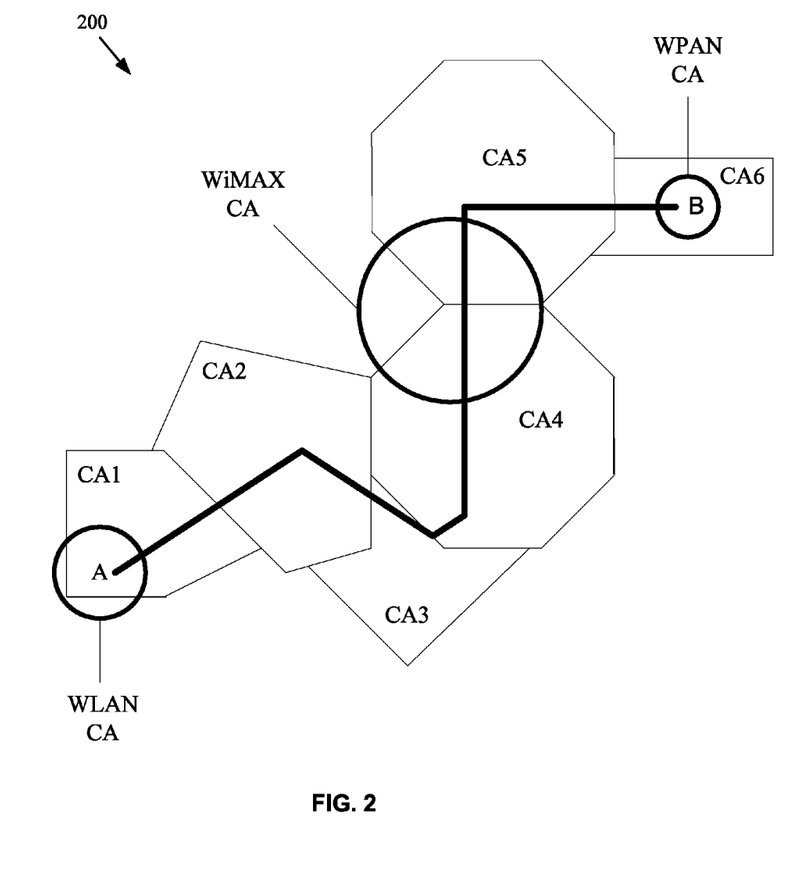
FIG. 2 is a block diagram illustrating an exemplary travel path for a mobile communication device that takes the mobile communication device through a plurality of coverage areas associated with one or more communication networks, in accordance with various aspects of the present invention.

FIG. 2 is a block diagram illustrating an exemplary wireless network and travel path for a mobile communication device, in accordance with various aspects of the present invention. Referring to FIG. 2, there is shown an exemplary wireless network 200 comprising a start point A, an end point B with the travel path indicated by the black line connecting point A to point B, and coverage areas CA1, CA2, CA3, CA4, CA5, CA6, WLAN CA, WiMAX CA, and WPAN CA.

Utilizing location information may allow information transfer to be efficiently planned and/or pre-arranged. For example, if it is known that the MCD 105 is going to be transitioning from a first coverage area with a first respective information transfer capability to a second coverage area with a second respective information transfer capability, information transfer may be delayed until the MCD 105 transitions to the second coverage area. For example, the second coverage area CA2 may have higher data-rate capabilities than the first coverage area CA1. In an exemplary scenario, the first and second coverage areas CA1 and CA2 may be associated with different communication networks.

For example, the first coverage area CA1 may be associated with a relatively slow, relatively expensive, or relatively high-power-utilization telecommunication network, and the second coverage area CA2 may be associated with a relatively fast, relatively inexpensive, or relatively low-power-utilization computer network.

In another exemplary scenario, the first and second coverage areas CA1 and CA2 may be associated with the same communication network. For example, first and second cells of a telecommunication network may have, permanently or temporarily, different respective amounts of available bandwidth, different respective channel conditions, and different associated power requirements. Pre-planning, or prearrangement, of information transfer may, in turn, provide for more desirable (for a variety of reasons) information transfer between (e.g., to and/or from) a communication network and the MCD 105.

In a non-limiting scenario, a portion or all of the information to be downloaded to the MCD 105 may be pushed down to an access point in preparation for communicating such information to the MCD 105. In a non-limiting example, all (or a substantial portion of) communication channel establishment activities may be performed (e.g., resource allocation, synchronization activities, power control activities, etc.) prior to the time at which the information transfer may be made. In a non-limiting example, the MCD 105 and/or network may be merely waiting for a particular signal or channel quality metric to be reached or a particular signal or channel quality comparison result to be achieved, with most other signal processing activities associated with the pending information transfer already having been performed. In such an exemplary scenario, real-time processing activities associated with the information transfer may be greatly reduced, resulting in an expeditious and efficient information transfer.

Location-based information transfer may be utilized to enable efficient transfer of data to and/or from MCDs. Location information may comprise any of a large variety of characteristics. For example, location information may comprise characteristics of coordinate information (e.g., longitude/latitude) associated with any of a variety of positioning coordinate systems. Additionally, location information may comprise characteristics of information particular to network coverage areas as well as information of known landmarks (e.g., identified buildings, homes, airports, intersections, campuses, cities, towns, transportation hubs and/or spurs, shopping centers, entertainment venues, etc.).

Location information may, at least in part, be specified manually. For example, pre-stored present locations, destinations and/or routes may be selected using keypad or other tactile input feature on the MCD 105, by selecting present location, destination and/or route from a menu. Examples may comprise selecting "home-to-work", "work-to-home", "home-to-airport", school-to-home", "work", "home", "airport", and "friend's house".

In another embodiment of the invention, voice recognition may be utilized such that a user may state the present location, destination and/or route, and voice recognition may be used to attach various location characteristics to the verbal input. For example, a voice input may be matched (e.g., by the MCD 105 or network) to a known stored present location, destination and/or route. Such route determination may, for example, take into consideration known present location and may be combined with a specified destination to determine a path. For example, a GPS module on-board the MCD 105 may know present location, which may be combined with a verbal destination statement to determine a route (or most likely route(s)) for the MCD 105.

In another embodiment of the invention, a graphical user interface (GUI) may be utilized to select a known present location, destination and/or route on a map by using a touch screen, or other GUI. For example, a user may use a mapping utility to call up a map and select or trace a route and/or accept a called-up route. A user of the MCD 105 may, for example, select icons or travel end-points, etc. Such selection may then, for example, be associated with a known route or be characterized as a new route, and may select a set of one or more coverage areas that the MCD will be traveling through. In an exemplary embodiment, a user may be presented with a map or list of selectable coverage areas and/or coverage area combinations.

In an embodiment of the invention, location information may be stored in any of a variety of locations. For example, present location, destination and/or route information may be stored in a memory of the MCD 105. Also for example, such location/route information may be stored in a personal computing device, such as a PC or server, that may be communicatively coupled to the MCD 105. Additionally for example, such location/route information may be stored in a communication network, such as a computer network, a telecommunications network, a base station, a network controller, or a central database, for example. The information may be stored in volatile or non-volatile memory (NVM), such as a removable NVM card or SIM, for example.

In another embodiment of the invention, location information, such as present location, destination and/or route information, for example, may be specified automatically (i.e., without direct user interaction). The MCD 105 may comprise processing capability to determine location—e.g., GPS, tied to known net locations, triangulation, UWB, etc. A mobile communication device (e.g., cellular phone, PDA, handheld computer, personal email device, portable media playing device, portable gaming device, etc.) could provide location information to the communication network. Such location information may, for example, comprise characteristics of present location information, destination information and/or route information.

A system (e.g., on-board the MCD 105, in a device of a communication network, or other device) may track a route that has already been entered to determine whether the route continues to be valid. In such an exemplary scenario, the system may issue a warning (e.g., to the communication network and/or user) when the MCD 105 has strayed from a specified path, such as the path defined by the line connecting point A to point B, for example. The tracked information may be combined with anticipatory route generation. For example, once the MCD 105 is determined to have strayed from a specified path, anticipatory route generation may be utilized to generate a remainder of a path and/or determine when a previously-specified path has been rejoined.

For anticipatory route generation, a system, such as the MCD 105, a communication network device, etc.) may track movement of the MCD 105. The system may use position tracking information to anticipate future movement of the MCD 105 through communication network coverage areas. For example, the system may use tracking information (e.g., along with time and/or day information) to select a path that the MCD 105 is traveling, and then communicate such path information to a device of the communication network or the MCD 105. The system may select an existing stored route or may generate a new route. For example, such selection/generation may depend on how close a presently determined route is to a previously stored route. For example, if a presently determined route is within an error margin of a previously stored route, the previously stored route may be utilized, at least temporarily. The MCD 105 and/or network may, for example, interface with the user during the anticipatory route generation process. For example, a user may be asked to verify a route change or to acknowledge a new determined route.

In another embodiment of the invention, a hybrid manual/automatic route generation process may be utilized. In an exemplary scenario, a user may specify a route. The MCD 105 (or network device or other device) may then use location information to track the route of the MCD 105. For example, the MCD 105 (or other device) may realize that the MCD 105 has strayed from a direct path to work (e.g., stopping for coffee, gas, etc.). In a scenario where the MCD 105 has strayed from an anticipated path (location and/or time), the MCD 105 (or other device) may also realize when the expected path is rejoined (e.g., mobile is through traffic jam or completed refueling). The MCD 105, one or more devices of the communication network, and/or other devices may communicate location or route information with the network. The route information may also generally comprise time information, which may, for example, assist the communication network to know when resources should be allocated to the hand-off preparation activities and the actual hand-off activities. The MCD 105 and/or network and/or other device may perform any of the activities discussed above.

In one non-limiting exemplary scenario, the MCD 105 may provide location information (e.g., present location information, destination information and/or route information) to the network. The information provided to the network may, for example, be mere location information or may be source, destination and/or route information. Portions of the path may be predicted using location information, location-change information, time/day information, etc. Route information may be deterministic, stochastic or a combination thereof. For example, if there is an N % probability of the MCD 105 passing through a particular coverage area during the commute to work, then pre-arrange information transfer. The processing of MCD 105 location information (e.g., present location, destination, intermediate locations and/or route) may comprise correlating such information with network access points and/or associated coverage areas for information transfer. Access points may be computer network access points, telecommunication network access points (e.g., cell base stations), etc.

Traveling from point A to point B, the MCD 105 may pass through cellular telecommunication coverage areas CA1-CA6 and may also pass through an exemplary WLAN coverage area, WiMAX coverage area and WPAN coverage area. Although the illustration in FIG. 2 and the discussion herein generally refer to information transfer between a MCD and respective access points of different communication networks, the principles may be extended to information transfer between a MCD and different access points of the same communication network.

One or more information transfers may be planned or pre-arranged based on the coverage areas through which the MCD 105 may be traveling in the future. For example, rather than merely planning to perform information transfer to and/or from the MCD 105 when the MCD 105 passed through a particular coverage area, various aspects of the present invention additionally may include performing anticipatory communication set-up activities to prepare for the pending information transfer.

For example, the system may know that the MCD 105 is going to travel (or most likely going to travel through) a particular coverage area in the future, so the system may perform information transfer planning and/or preparation activities in advance, rather than, for example, waiting for one or more signal or channel qualities to indicate that a communication channel between the MCD 105 and an access point of the coverage area may be established.

In a non-limiting scenario, the MCD 105 may communicate with a second communication network through a first communication network to pre-establish communication parameters between the MCD 105 and the second communication network prior to the MCD 105 and the second communication network being able to communicate with each other directly. For example, the system may set up all or almost all of the necessary communication parameters for the anticipated information transfer and then just wait for a triggering event to trigger information transfer (e.g., signal and/or channel conditions, like S/N or SIR conditions, indicating that information transfer may begin). Additionally, the system may allocate access point resources (and/or other communication system resources) for the information transfer and communicate information of such allocation in advance of the determination being made to begin the information transfer.

The communication network may notify the MCD 105 (or the MCD 105 may already know) of the communication parameters (e.g., codes, channels, locations, powers, timings, etc.) associated with the next access point so that the MCD 105 may begin listening for communications (to the mobile communication device or with other devices) from the next access point in a targeted or a prioritized manner. The MCD may devote relatively more resources listening for signals associated with a targeted base station (or access point) than devoted to listening for signals associated with other less likely base stations. On the network side, a base station (or access point) may also devote relatively more resources to the pending information transfer with the MCD 105 than devoted to a random MCD in a nearby coverage area with which no present association exists.

Such pre-arrangement of information transfer may generally shift processing, communication and/or resource allocation activities into the non-real-time realm, minimizing the amount of time and resources needed to perform the information transfer when the time comes. Such processing shifting may also advantageously affect power consumption. The prearrangement of information transfer may, for example, comprise prearranging protocol and/or RF parameters. For example, the type of source and/or channel coding may be pre-specified. In such a scenario, various MCD 105 and/or network components may be configured prior to the determination being made to transfer the information. In another example, modulation type may be pre-specified (e.g., baseband and/or IF and/or RF modulation).

In yet another example, beam-forming parameters may be prearranged for directing RF energy to/from particular known locations. For example, in an exemplary scenario, the communication network (or MCD 105 or other device) may know that information transfer with the MCD 105 is going to occur near a particular location, so the system may direct RF reception/transmission to the particular location. As a non-limiting example, an access point may utilize an antenna array to direct a beam to a particular location at which information transfer with the MCD 105 may be expected to begin/occur.

In an embodiment of the invention, prearrangement may, for example, comprise general network resource allocation. Such allocated resources may, for example, comprise bandwidth, channels, codes, antennas, etc., for one or more access points. The actual information transfer may be triggered on channel and/or signal conditions or may also be triggered by information other than signal quality information. Such triggering may be based, at least in part, on a combination of location/route information and signal (or channel) quality information.

In an exemplary embodiment, location information may be utilized to initiate prearrangement of information transfer, and signal and/or channel quality may be utilized to determine exactly when to perform the prearranged or planned information transfer. Also such triggering of the actual information transfer may be based solely on location information, or for example on any information other than channel or signal quality. For example, when the MCD 105 may have a location that corresponds to a coverage area of a particular access point, the access point and/or MCD 105 may begin communicating (or at least attempting to communicate) the information, with or without information of channel and/or signal quality.

In another exemplary embodiment, the information transfer may be triggered based, at least in part, on time/day. For example, based on a known travel path for a MCD, the MCD 105 may be predicted to be in a particular coverage area on a particular day during a particular time window.

Figure 3:
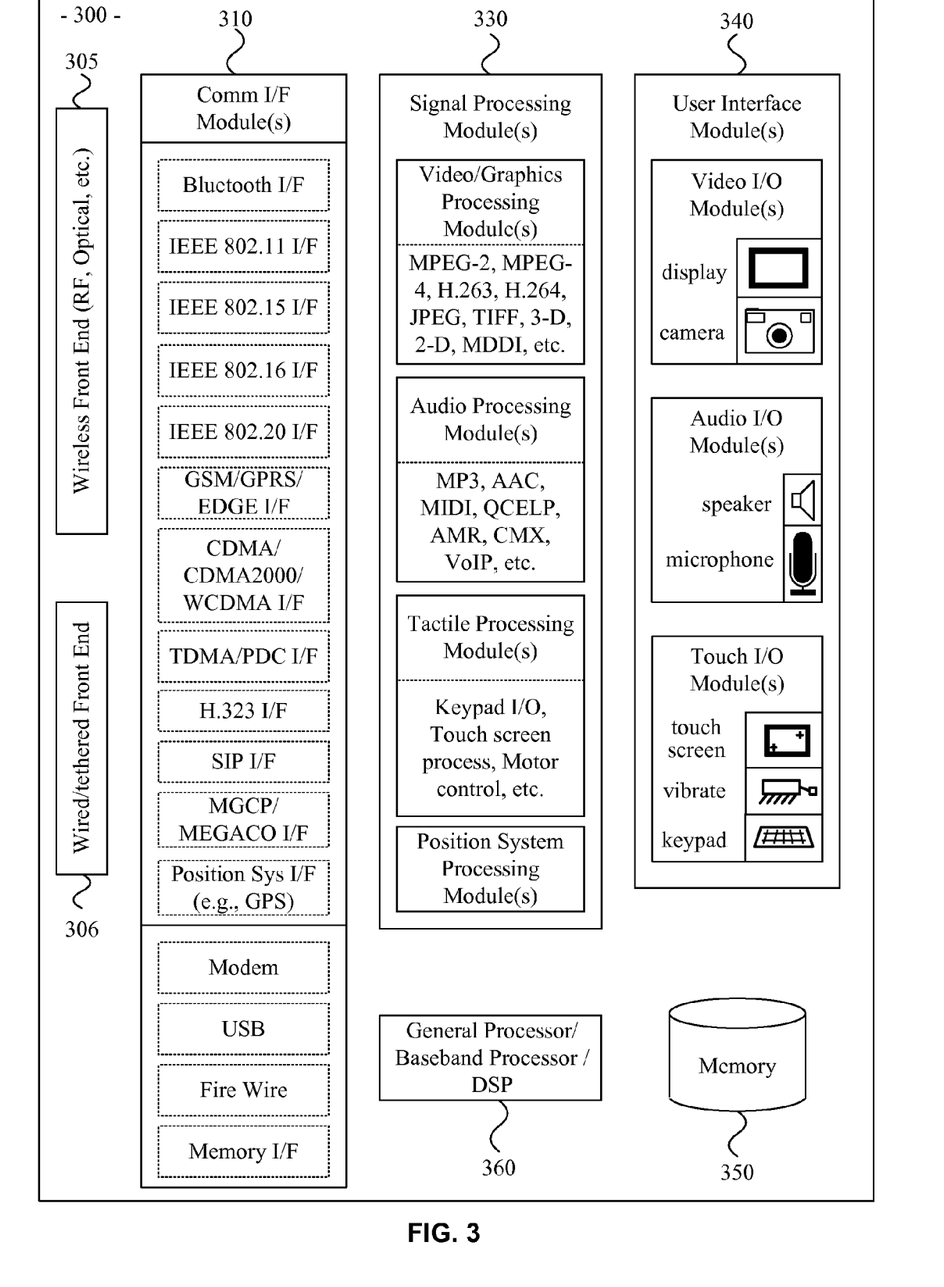
FIG. 3 is a block diagram illustrating a non-limiting exemplary mobile communication device, in accordance with various aspects of the present invention.

FIG. 3 is a block diagram illustrating a non-limiting exemplary mobile communication device, in accordance with various aspects of the present invention. The exemplary mobile communication device ("MCD") 300 may be substantially similar to the MCD 105 (e.g., sharing any or all characteristics with the MCD 105).

For example, the exemplary MCD 300 may comprise any of a variety of communication interface modules 310, a wireless front end 305 and a wired/tethered front end 306. Also for example, the MCD 300 may comprise a processor 360 and memory 350, which may, for example and without limitation, execute and store executable instructions to implement various functionality discussed previously.

The exemplary MCD 300 is illustrated with a non-limiting exemplary set of communication interface modules 310, including: a Bluetooth interface module, IEEE 802.11 interface module, IEEE 802.15 interface module, IEEE 802.16 interface module, IEEE 802.20 interface module, GSM/GPRS/EDGE interface module, CDMA/CDMA2000/WCDMA interface module, TDMA/PDC interface module, H.323 interface module, SIP interface module, MGCP/MEGACO interface module, modem module, USB module, fire wire module and memory interface module (e.g., for interfacing with off-board or removable memory).

Further for example, the exemplary MCD 300 may comprise any of a variety of signal processing modules 330. The exemplary MCD 300 is illustrated with a non-limiting exemplary set of signal processing modules 330, which may be selectively utilized in accordance with current signal processing needs. The signal processing modules 330 may, for example, comprise various video, audio (e.g., VoIP), textual, graphical and tactile signal-processing modules. The signal processing modules 330 may generally, for example, process information conveyed between the front ends 305 and 306 and communication interface module(s) 310 of the MCD 300 and the user interface module(s) 340 of the mobile communication device 300.

Still further for example, the exemplary MCD 300 may comprise any of a variety of user interface modules 340, at least some of which may be optimizable in accordance with various communication services. The user interface module(s) 340 may, for example and without limitation, comprise any of a variety of video/graphics processing modules, audio processing modules, and tactile signal processing modules. The mobile communication device 300 may also comprise compatible user interface devices corresponding to the various user interface module(s) 340 (e.g., a video display, camera, speaker, microphone, touch screen, keypad, vibrator, etc.). Such user interface modules 340 and/or user interface devices may generally correspond to various communication services that may be provided to a user by the MCD 300.

The exemplary MCD 300 illustrated in FIG. 3 was presented to illustrate a portion of generally broader aspects of the present invention. Accordingly, the scope of various aspects of the present invention should not be limited by characteristics of the exemplary illustration.

Various aspects of the present invention have been described above with the aid of functional (or communication layer) building blocks illustrating the performance of certain significant functions (or communication layers). The boundaries of these blocks and relationships between various blocks have been defined and/or presented for convenience of description. Alternate boundaries or relationships could be defined so long as the certain significant functions are appropriately performed. Such alternate boundaries or relationships are thus within the scope and spirit of the claimed invention. Additionally, the functional (or communication layer) building blocks, and other illustrative blocks, modules and components herein, can be implemented as illustrated or by discrete components, application specific integrated circuits, processors executing appropriate software and the like or any combination thereof. For example and without limitation, any of the previously discussed optimizable PHY layer circuitry may be implemented in a single integrated circuit.

Figure 4:
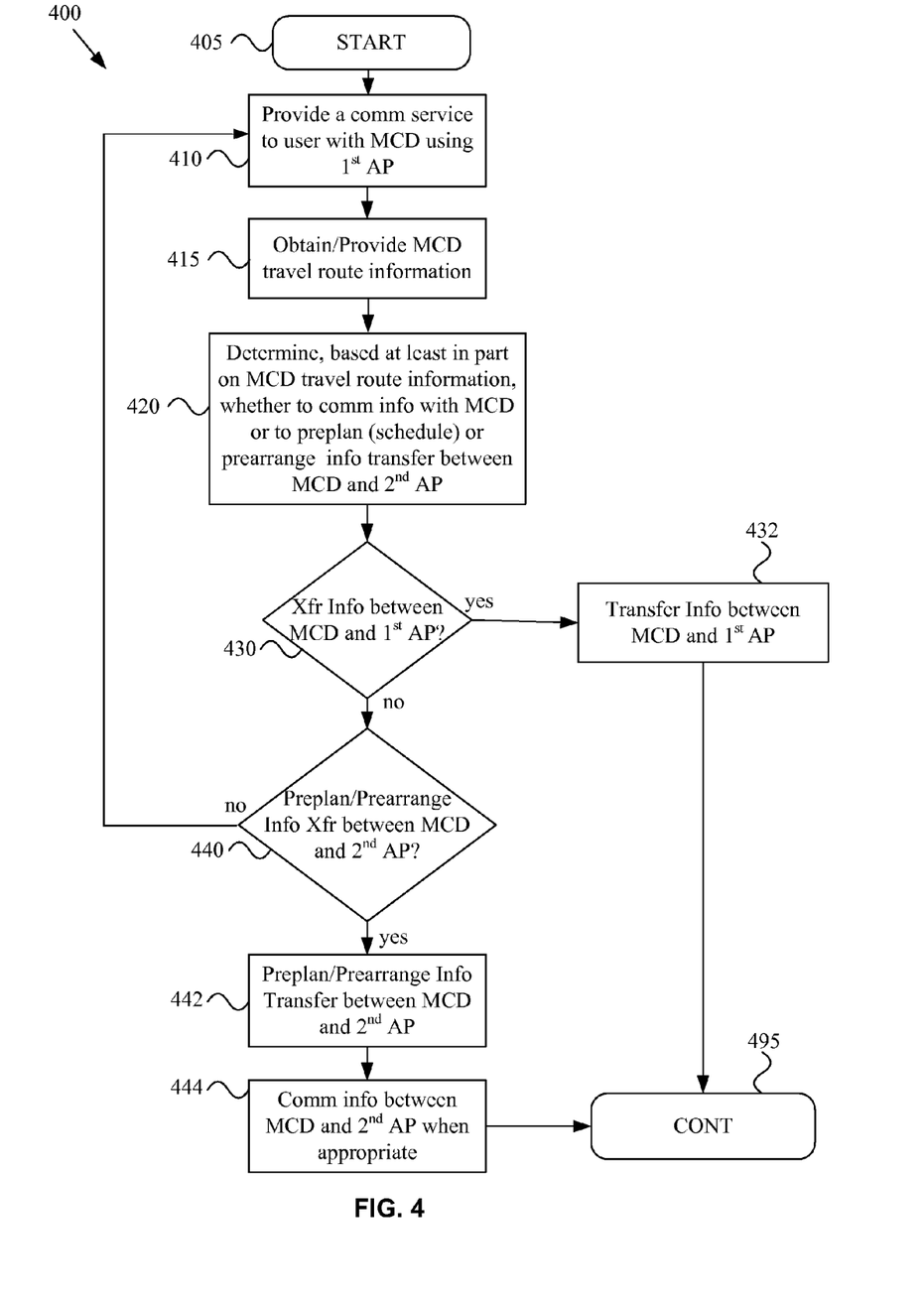
FIG. 4 is a non-limiting illustration of exemplary method steps that a mobile communication device may perform, in accordance with an embodiment of the invention.

FIG. 4 is a non-limiting illustration of exemplary method steps that a mobile communication device may perform, in accordance with an embodiment of the invention. In the exemplary illustration, the information transfer pre-planning and/or prearrangement may occur within a second access point while a first access point, such as a cellular communication service, may continue to provide another communication service to the MCD 105. Although not shown, FIG. 4 and/or any or all exemplary scenarios herein may comprise determining how to communicate the particular information with the MCD 105. Such information transfer may be, for example and without limitation, initiated by a user of the MCD 105, the MCD 105 autonomously, network infrastructure apparatus, a communication service provider, or any party and/or apparatus with an interest in such information transfer.

In step 410, following start step 405, the MCD 105 may be provided communication service by an access point in a first coverage area. In step 415, the MCD 105 travel route information may be obtained or provided, followed by step 420 where it may be determined whether to communicate desired information with the MCD 105 or to preplan/schedule the information transfer between the MCD 105 and a second access point in another coverage area, based on the MCD 105 travel route information. If, in step 430, it is determined that the information is to be transferred between the MCD 105 and the first access point, the exemplary steps may proceed to step 432 where the information may be communicated before proceeding to continue step 495.

If, in step 430, it is determined that the information will not be communicated between the first access point and the MCD 105, the exemplary steps may proceed to step 440, where it may be determined whether the information transfer may be preplanned/prearranged between the MCD 105 and a second access point. If not, the exemplary steps may proceed back to step 410, but if so, the information transfer between the MCD 105 and the second access point may be preplanned/prearranged in step 442. In step 444, the desired information may be communicated between the MCD 105 and the second access point when appropriate followed by the continue step 495.

Figure 5:
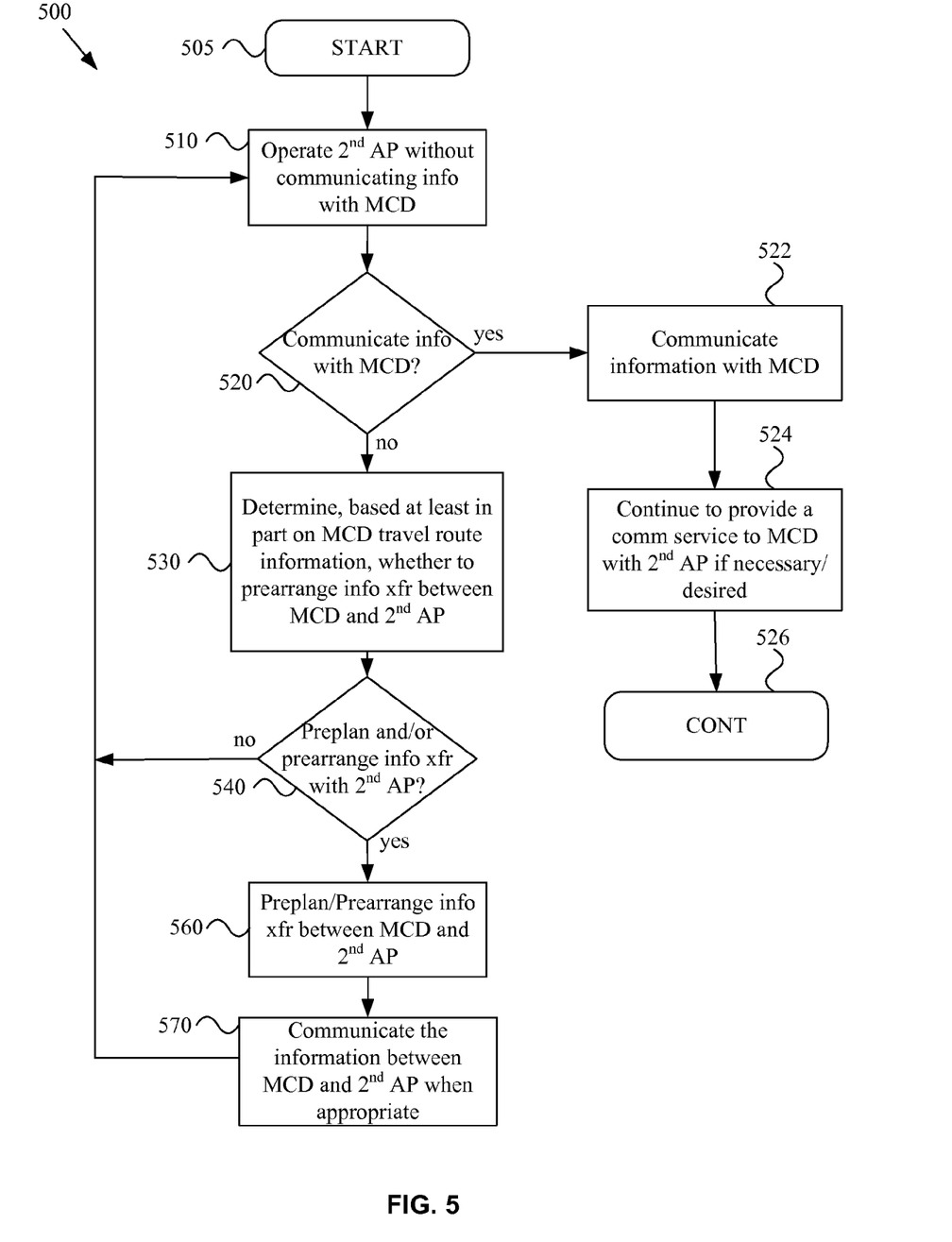
FIG. 5 is a diagram providing a non-limiting exemplary illustration of method steps that a communication network access point might perform, in accordance with various aspects of the present invention.

FIG. 5 is a diagram providing a non-limiting exemplary illustration of method steps that a communication network access point might perform, in accordance with various aspects of the present invention. After start step 505, in step 510, a second access point may operate without communicating with the MCD 105. If, in step 520, it is determined that the access point is to communicate the desired information with the MCD 105, the exemplary steps may proceed to step 522 where the access point may communicate the desired information with the MCD 105 before proceeding to step 524 where the communication service may be continued, followed by the continue step 526.

If, in step 520, it is determined that the second access point is not to communicate the desired information with the MCD 105, the exemplary steps may proceed to step 530 where it may be determined, based at least in part on the MCD 105 travel route information, whether to prearrange the information transfer between the MCD 105 and the second access point. In step 540, if it is determined that the information transfer is to be preplanned/prearranged, the exemplary steps may proceed to step 560 where the information transfer between the MCD 105 and the second access point may be preplanned/prearranged. In step 570, the desired information may be communicated between the MCD 105 and the second access point when appropriate before returning to step 510.

If, in step 540, it is determined that communication of the desired information between the MCD 105 and the second access point is not to be preplanned/prearranged, the exemplary steps may return to step 510.

Figure 6:
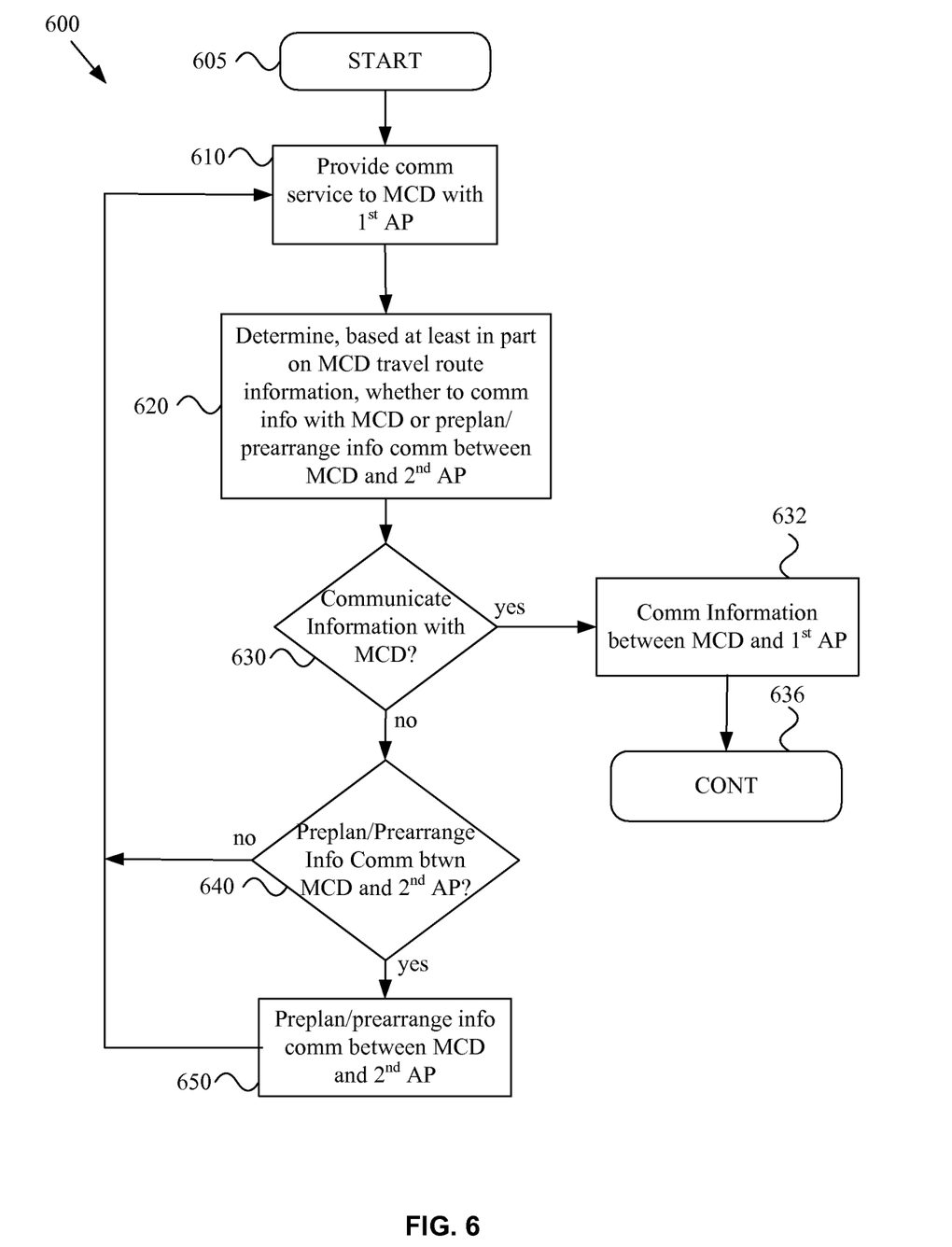
FIG. 6 is a diagram providing a non-limiting exemplary illustration of method steps that communication network access points might perform, in accordance with various aspects of the present invention.

FIG. 6 is a diagram providing a non-limiting exemplary illustration of method steps that communication network access points might perform, in accordance with various aspects of the present invention. After start step 605, in step 610, communication services may be provided to the MCD 105 by a first access point. In step 620, it may be determined based at least in part on MCD 105 travel route information, whether to communicate desired information with the MCD 105 or to preplan/prearrange information communication between the MCD 105 and a second access point. In step 630, if it is determined that the desired information may be communicated with the MCD 105, the exemplary steps may proceed to step 632 where the information may be communicated between the MCD 105 and the first access point followed by the continue step 636 where the process may continue for further access points along the MCD 105 travel route.

If in step 630, it is determined that the desired information is not to be communicated the MCD 105, the exemplary steps may proceed to step 640 where the information communication may be preplanned/prearranged between the MCD 105 and the second access point. If in step 630, it is determined that the desired information is to be communicated the MCD 105, the exemplary steps may proceed to step 650 where the communication of the desired information may be preplanned/prearranged between the MCD 105 and the second access point before returning to step 610.

Note that any of the steps illustrated in FIGS. 4-6 may be performed by other devices, such as, for example, communication network controller devices. For example and without limitation, a network controller, access point and/or MCD may make the ultimate determination of whether to preplan/prearrange the communication of information between the MCD, the first AP, second AP, etc. A service comprising such preplanned or prearranged information transfer technology may be part of an enhanced-quality communication service package or may be standard. For example, a consumer may pay relatively more money for a communication service plan that provides for the intelligent information transfer discussed previously (e.g., to save overall cost, save power consumption, acquire more reliable communication, more secure communication, etc.). In such a manner, a communication network operator may receive compensation for allocation of resources before such resources are actually used.

In an embodiment of the invention, a method and system are disclosed for pre-planning communication of information with a mobile communication device (MCD) 105 based on present and future locations of the MCD 105 and the availability of wireless services in the present and future locations. The MCD 105 may comprise location-determining capability which may comprise one or more of: a global navigation satellite system, triangulation, and ultra-wideband positioning. A travel route of the MCD 105 may be anticipated utilizing the present and future locations. The travel route may traverse one or more wireless coverage areas CA1-CA6, WiMAX CA, WLAN CA, and WPAN CA, and the communication of information with the MCD 105 may be configured when the travel route enters a wireless coverage area CA1-CA6, WiMAX CA, WLAN CA, and WPAN CA with a wireless capability at a desired level. The desired level may comprises one or more of: bandwidth, data transfer rate, cost, power requirements, channel conditions, quality of service, and secure communications capability. The information may comprise multimedia data and the MCD 105 may comprise a plurality of wireless protocol capabilities.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for anticipatory location-based mobile communication media transfer.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for enabling communication, the method comprising:
   scheduling, by a network access point, a media transfer to a mobile communication device while said mobile communication device is traveling along a selected travel route to a determined location, said determined location being a selected end-point of said selected travel route;
   determining, by said network access point, a time goal to said media transfer based on a media transfer routine of said mobile communication device; and
   initiating, by said network access point, said media transfer when said mobile communication device arrives at said determined location, said scheduling based on said determined location, said selected travel route, times said mobile communication device reached locations along said selected travel route, and said determined time goal to said media transfer.

2. The method according to claim 1, wherein said media transfer routine is determined via machine learning.

3. The method according to claim 1, wherein said determined time goal is based on input entered via a user interface of said mobile communication device.

4. The method according to claim 3, wherein said input specifies a deadline to initiate said media transfer.

5. The method according to claim 1, comprising: subsequent to said scheduling and prior to said initiating of said media transfer, at least partially establishing a communication channel for said media transfer, wherein said at least partially establishing said communication channel includes allocating resources associated with said communication channel.

6. The method according to claim 1, subsequent to said scheduling, and prior to said initiating of said media transfer, comprising:
communicating information associated with said media transfer to an access point; and
directing an antenna of said access point in a direction of a location in which said media transfer is expected to occur.

7. The method according to claim 1, wherein said determination of said media transfer routine is based on stochastic information.

8. The method according to claim 7, wherein said media transfer routine is a daily routine, weekly routine, or both.

9. The method according to claim 1, further comprising receiving additional route information associated with a diversion from said selected travel route, and wherein said scheduling is further based on said additional route information.

10. The method according to claim 9, further comprising determining a new route according to said additional route information, and wherein said scheduling is further based on said new route.

11. The method according to claim 1, further comprising:
receiving additional route information associated with a diversion from said selected travel route; and
determining an error margin associated with said diversion from said selected travel route, wherein said scheduling is further based on said error margin.

12. A system for enabling communication, the system comprising:
one or more processors of a network access point, said one or more processors configured to:
schedule a media transfer to a mobile communication device while said mobile communication device is traveling along a selected travel route to a determined location, said determined location being a selected end-point of said selected travel route; and
determine a time goal to said media transfer based on a media transfer routine of said mobile communication device,
said media transfer to be initiated when said mobile communication device arrives at said determined location,
said scheduling based on said determined location, said selected travel route, times said mobile communication device reached locations along said selected travel route, and said determined time goal to said media transfer; and
a receiver communicatively coupled to said one or more processors, said receiver configured to receive additional route information associated with a diversion from said selected travel route, and wherein said scheduling is further based on said additional route information.

13. The system according to claim 12, wherein said media transfer routine is determined via machine learning.

14. The system according to claim 12, wherein said determination of said media transfer routine is based on stochastic information.

15. The system according to claim 14, wherein said media transfer routine is a daily routine, weekly routine, or both.

16. The system according to claim 12, wherein said one or more processors are further configured to determine a new route according to said additional route information, and wherein said scheduling is further based on said new route.

17. The system according to claim 12, wherein said one or more processors are further configured to determine an error margin associated with said diversion from said selected travel route, wherein said scheduling is further based on said error margin.

18. The system according to claim 12, wherein said one or more processors are further configured to determine an error margin associated with said diversion from said selected travel route, wherein said scheduling is only further based on said additional route information if said error margin exceeds a threshold.

19. A machine-readable storage device having stored thereon, a computer program having at least one code section for processing data in a communication system, said at least one code section being executable by a machine for causing said machine to perform steps comprising:
schedule a media transfer to a mobile communication device while said mobile communication device is traveling along a selected travel route to a determined location, said determined location being a selected end-point of said selected travel route; and
determine a time goal to said media transfer based on a media transfer routine of said mobile communication device,
said media transfer to be initiated when said mobile communication device arrives at said determined location,
said scheduling based on said determined location, said selected travel route, times said mobile communication device reached respective locations along said selected travel route, said determined time goal for said media transfer, and availability of wireless services in said locations along said selected travel route.

20. The machine-readable storage device according to claim 19, wherein said media transfer routine is determined via machine learning.

21. The machine-readable storage device according to claim 19, wherein said determination of said media transfer routine is based on stochastic information.

22. The machine-readable storage device according to claim 21, wherein said media transfer routine is a daily routine, weekly routine, or both.

23. The machine-readable storage device according to claim 19, wherein said steps further comprise receiving additional route information associated with a diversion from said selected travel route, and wherein said scheduling is further based on said additional route information.

24. The machine-readable storage device according to claim 23, wherein said steps further comprise determining a new route according to said additional route information, and wherein said scheduling is further based on said new route.

25. The machine-readable storage device according to claim 19, wherein said steps further comprise:
  receiving additional route information associated with a diversion from said selected travel route; and
  determining an error margin associated with said diversion from said selected travel route, wherein said scheduling is further based on said error margin.

\* \* \* \* \*